United States Patent
Yamaguchi et al.

(10) Patent No.: US 10,434,753 B2
(45) Date of Patent: Oct. 8, 2019

(54) PLASTIC SHEET, METHOD FOR MANUFACTURING PLASTIC SHEET, INTERLAYER FILM FOR LAMINATED GLASS, AND LAMINATED GLASS

(71) Applicant: SEKISUI CHEMICAL CO., LTD., Osaka, Osaka (JP)

(72) Inventors: Kouhei Yamaguchi, Kouka (JP); Masaki Yamamoto, Kouka (JP); Daisuke Nakajima, Kouka (JP); Izumi Matsumoto, Kouka (JP); Masaki Matsudou, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/121,365

(22) PCT Filed: Feb. 25, 2015

(86) PCT No.: PCT/JP2015/055440
§ 371 (c)(1),
(2) Date: Aug. 24, 2016

(87) PCT Pub. No.: WO2015/129759
PCT Pub. Date: Sep. 3, 2015

(65) Prior Publication Data
US 2016/0368246 A1    Dec. 22, 2016

(30) Foreign Application Priority Data
Feb. 25, 2014 (JP) .................... 2014-034467

(51) Int. Cl.
*B32B 17/10* (2006.01)
*B32B 27/22* (2006.01)
(Continued)

(52) U.S. Cl.
CPC .... *B32B 17/1055* (2013.01); *B32B 17/10036* (2013.01); *B32B 17/10678* (2013.01);
(Continued)

(58) Field of Classification Search
None
See application file for complete search history.

(56) References Cited

U.S. PATENT DOCUMENTS 3,341,399 A * 9/1967 Hazdra ............. B32B 17/10036
428/429
3,900,673 A * 8/1975 Mattimoe ......... B32B 17/10036
156/106
(Continued)

FOREIGN PATENT DOCUMENTS

CA    2 863 403 A1    8/2013
EP    2 347 898 A1    7/2011
(Continued)

OTHER PUBLICATIONS

International Preliminary Report (PCT/IPEA/408) for Application No. PCT/JP2015/055440 dated Apr. 12, 2016 (English Translation dated Aug. 25, 2016).
(Continued)

*Primary Examiner* — David Sample
(74) *Attorney, Agent, or Firm* — Cheng Law Group, PLLC (57) ABSTRACT

There are provided a plastic sheet making the inter-layer peeling in laminated glass become difficult to occur, and furthermore, being capable of enhancing the penetration resistance of laminated glass, and an interlayer film for laminated glass prepared therewith. The plastic sheet used for an interlayer film for laminated glass according to the present invention is a plastic sheet used for an interlayer film for laminated glass and has a first surface and a second
(Continued)

surface opposite to the first surface which are coated with a surface treatment agent or modified by a surface treatment so that the wetting tension of each of the first surface and the second surface is greater than or equal to 40 mN/m.

10 Claims, 1 Drawing Sheet (51) Int. Cl.
*B32B 27/30* (2006.01)
*B32B 27/08* (2006.01)
*C03C 27/10* (2006.01)

(52) U.S. Cl.
CPC ........ *B32B 17/10761* (2013.01); *B32B 27/08* (2013.01); *B32B 27/22* (2013.01); *B32B 27/306* (2013.01); *C03C 27/10* (2013.01); *B32B 2250/03* (2013.01); *B32B 2419/00* (2013.01); *B32B 2605/00* (2013.01); *B32B 2605/006* (2013.01)

(56) References Cited

U.S. PATENT DOCUMENTS

| | | | | |
|---|---|---|---|---|
| 4,112,171 | A * | 9/1978 | Motter | B32B 17/10018 |
| | | | | 428/213 |
| 4,469,743 | A | 9/1984 | Hiss | |
| 5,569,537 | A * | 10/1996 | Miyasaka | B32B 17/10018 |
| | | | | 428/425.5 |
| 6,372,352 | B1 * | 4/2002 | Bletsos | B32B 17/10036 |
| | | | | 427/369 |
| 9,878,523 | B2 * | 1/2018 | Uto | B32B 27/08 |
| 2001/0046595 | A1 | 11/2001 | Moran et al. | |
| 2003/0054160 | A1 | 3/2003 | Fisher et al. | |
| 2005/0170160 | A1 | 8/2005 | Moran et al. | |
| 2007/0196629 | A1 | 8/2007 | Smith et al. | |
| 2009/0155576 | A1 | 6/2009 | Anderson | |
| 2009/0223704 | A1 * | 9/2009 | Osada | B29C 55/023 |
| | | | | 174/258 |
| 2013/0224456 | A1 | 8/2013 | Moran et al. | |
| 2013/0288061 | A1 * | 10/2013 | Kitano | B32B 17/10633 |
| | | | | 428/437 |
| 2014/0127485 | A1 * | 5/2014 | Uto | B32B 7/02 |
| | | | | 428/212 |
| 2015/0030860 | A1 | 1/2015 | Shimamoto et al. | |

FOREIGN PATENT DOCUMENTS

| | | |
|---|---|---|
| JP | 2001-106556 A | 4/2001 |
| JP | 2003-516921 A | 5/2003 |
| JP | 2005-186613 A | 7/2005 |
| JP | 2008-303084 A | 12/2008 |
| JP | 2010-13311 A | 1/2010 |
| JP | 2010-180090 A | 8/2010 |
| JP | 2011-42552 A | 3/2011 |
| JP | 2012-81748 A | 4/2012 |
| JP | 2012-240271 A | 12/2012 |
| JP | 2013-6723 A | 1/2013 |
| JP | 2013-6727 A | 1/2013 |
| JP | 2013-6728 A | 1/2013 |
| JP | 2013-163616 A | 8/2013 |
| JP | 2013-163640 A | 8/2013 |
| WO | WO-01/43963 A1 | 6/2001 |
| WO | WO-2010/119771 A1 | 10/2010 |

OTHER PUBLICATIONS

International Search Report for the Application No. PCT/JP2015/055440 dated Jun. 2, 2015.
International Preliminary Report (PCT/IPEA/408) for Application No. PCT/JP2015/055440 dated Apr. 12, 2016.
Supplementary European Search Report for the Application No. EP 15 75 5622 dated Aug. 23, 2017.
Database WPI, Week 201057, Thomson Scientific, London, GB; AN 2010-K62488, XP002772910 (and JP 2010-180090 A).
Database WPI, Week 200156, Thomson Scientific, London, GB; AN 2001-505192, XP002772911 (and JP 2001-106556 A previously filed in USPTO on Aug. 24, 2016).
Database WPI, Week 201307, Thomson Scientific, London, GB; AN 2013-A43395, XP002772912 (and JP 2013-6723 A previously filed in USPTO on Aug. 24, 2016).
European Office Action for the Application No. 15 755 622.6 dated Apr. 24, 2019.

* cited by examiner

PLASTIC SHEET, METHOD FOR MANUFACTURING PLASTIC SHEET, INTERLAYER FILM FOR LAMINATED GLASS, AND LAMINATED GLASS

TECHNICAL FIELD

The present invention relates to a plastic sheet used for an interlayer film for laminated glass and a method for manufacturing the plastic sheet. Moreover, the present invention relates to an interlayer film for laminated glass which is prepared with the plastic sheet and is used for laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates. Laminated glass is required to be less liable to break even when subjected to external impact and is required to have an enhanced penetration resistance.

As an example of the interlayer film for laminated glass, the following Patent Document 1 discloses an interlayer film including two resin layers (A) which contain a transparent adhesive resin and a resin layer (B) which is arranged between the two resin layers (A) and contains polyethylene terephthalate.

The following Patent Document 2 discloses an interlayer film being a laminate formed of a plasticized polyvinyl acetal resin film or being a laminate formed of a plasticized polyvinyl acetal resin film and a polyester film. Patent Document 2 describes that an amino-based silane coupling agent is applied to the lamination interface in the laminate. Patent Document 2 describes that the basis weight of the amino-based silane coupling agent is preferably 2 to 10 mg/m$^2$, the sound insulating effect in a low temperature region created by the adhesive layer formation is not sufficient when less than 2 mg/m$^2$, and there is a possibility for an interlayer film for laminated glass to turn yellow in the case of being used for a long period of time when greater than 10 mg/m$^2$.

RELATED ART DOCUMENT

Patent Document

Patent Document 1: JP 2008-303084 A
Patent Document 2: JP 2001-106556 A

SUMMARY OF THE INVENTION

Problems to be Solved by the Invention

With regard to laminated glass prepared with such conventional interlayer films described in the foregoing Patent Documents 1 and 2, particularly when a plastic layer such as polyethylene terephthalate exists, there are cases where the inter-layer peeling occurs. Furthermore, there are cases where the penetration resistance of the resulting laminated glass is not sufficiently enhanced.

An object of the present invention is to provide a plastic sheet making the inter-layer peeling in laminated glass become difficult to occur, and furthermore, being capable of enhancing the penetration resistance of laminated glass, and a method for manufacturing the plastic sheet. Moreover, an object of the present invention is to provide an interlayer film for laminated glass prepared with the plastic sheet. Moreover, an object of the present invention is to provide laminated glass prepared with the interlayer film for laminated glass.

Means for Solving the Problems

According to a broad aspect of the present invention, there is provided a plastic sheet used for an interlayer film for laminated glass, having a first surface and a second surface opposite to the first surface which are coated with a surface treatment agent or modified by a surface treatment so that the wetting tension of each of the first surface and the second surface is greater than or equal to 40 mN/m.

According to a broad aspect of the present invention, there is provided a method for manufacturing a plastic sheet used for an interlayer film for laminated glass, including the step of providing a plastic sheet to be treated having a wetting tension of each of a first surface and a second surface opposite to the first surface of less than 40 mN/m and coating a surface treatment agent on the first surface and the second surface or modifying the first surface and the second surface by a surface treatment so that the wetting tension of each of the first surface and the second surface is greater than or equal to 40 mN/m.

According to a broad aspect of the present invention, there is provided an interlayer film for laminated glass including a plastic layer constituted of a plastic sheet used for an interlayer film for laminated glass described above and a first resin layer layered on a first surface of the plastic layer, the interlayer film being provided or not being provided with a second resin layer layered on a second surface opposite to the first surface of the plastic layer.

In a specific aspect of the interlayer film for laminated glass according to the present invention, the interlayer film for laminated glass is provided with the second resin layer.

In a specific aspect of the interlayer film for laminated glass according to the present invention, the content of the hydroxyl group of the polyvinyl acetal resin contained in the first resin layer is greater than or equal to 29% by mole, and when the interlayer film is provided with the second resin layer, the content of the hydroxyl group of the polyvinyl acetal resin contained in the second resin layer is greater than or equal to 29% by mole.

It is preferred that the first resin layer contain a polyvinyl acetal resin and a plasticizer. Moreover, it is preferred that the second resin layer contain a polyvinyl acetal resin and a plasticizer. It is preferred that the first resin layer contain an ultraviolet ray screening agent. Moreover, it is preferred that the second resin layer contain an ultraviolet ray screening agent. It is preferred that the first resin layer contain an oxidation inhibitor. Moreover, it is preferred that the second resin layer contain an oxidation inhibitor.

According to a broad aspect of the present invention, there is provided laminated glass including a first laminated glass member, a second laminated glass member and an interlayer film for laminated glass described above, the interlayer film for laminated glass being arranged between the first laminated glass member and the second laminated glass member.

Effect of the Invention

Since the plastic sheet used for an interlayer film for laminated glass according to the present invention has a first surface and a second surface opposite to the first surface which are coated with a surface treatment agent or modified by a surface treatment so that the wetting tension of each of the first surface and the second surface is greater than or equal to 40 mN/m, by preparing laminated glass with an interlayer film for laminated glass according to the present invention, the inter-layer peeling in laminated glass is made to become difficult to occur, and furthermore, the penetration resistance of the resulting laminated glass can be enhanced.

Since the method for manufacturing a plastic sheet used for an interlayer film for laminated glass according to the present invention includes the step of providing a plastic sheet to be treated having a wetting tension of each of a first surface and a second surface opposite to the first surface of less than 40 mN/m and coating a surface treatment agent on the first surface and the second surface or modifying the first surface and the second surface by a surface treatment so that the wetting tension of each of the first surface and the second surface is greater than or equal to 40 mN/m, the inter-layer peeling in laminated glass is made to become difficult to occur, and furthermore, the penetration resistance of the resulting laminated glass can be enhanced.

MODE(S) FOR CARRYING OUT THE INVENTION

Hereinafter, the present invention will be described in detail.

(Plastic Sheet)

The plastic sheet used for an interlayer film for laminated glass according to the present invention has a first surface and a second surface opposite to the first surface which are coated with a surface treatment agent or modified by a surface treatment so that the wetting tension of each of the first surface and the second surface is greater than or equal to 40 mN/m. It is preferred that the plastic sheet used for an interlayer film for laminated glass according to the present invention be obtained by using a plastic sheet to be treated having a wetting tension of each of a first surface and a second surface of less than 40 mN/m and coating the surface thereof as above or modifying the surface thereof as above. Because the inter-layer peeling in laminated glass can be further prevented, the wetting tension of each of the first surface and the second surface is preferably greater than or equal to 43 mN/m, more preferably greater than or equal to 45 mN/m, further preferably greater than or equal to 50 mN/m and especially preferably greater than or equal to 55 mN/m. Although the upper limit of the wetting tension of each of the first surface and the second surface is not particularly limited, the wetting tension is preferably less than or equal to 100 mN/m, more preferably less than or equal to 80 mN/m and further preferably less than or equal to 60 mN/m.

In the method for manufacturing a plastic sheet used for an interlayer film for laminated glass according to the present invention, a plastic sheet to be treated having a wetting tension of each of a first surface and a second surface opposite to the first surface of less than 40 mN/m is used, and the first surface and the second surface are coated with a surface treatment agent or modified by a surface treatment so that the wetting tension of each of the first surface and the second surface is greater than or equal to 40 mN/m.

In the case of being coated with a surface treatment agent, "a plastic sheet to be treated" mentioned above means a plastic sheet with a first surface and a second surface before being coated with a surface treatment agent, and in the case of being modified by a surface treatment, "a plastic sheet to be treated" mentioned above means a plastic sheet with a first surface and a second surface before being modified by a surface treatment.

The first surface and the second surface may be coated with a surface treatment agent and may be modified by a surface treatment. Moreover, the first surface may be coated with a surface treatment agent and the second surface may be modified by a surface treatment, and furthermore, the first surface may be modified by a surface treatment and the second surface may be coated with a surface treatment agent. The wetting tension needs only to be controlled to be greater than or equal to 40 mN/m.

Since each of the plastic sheet according to the present invention and the method for manufacturing a plastic sheet according to the present invention is provided with the above-mentioned configuration, the inter-layer peeling can be made to become difficult to occur at the time of preparing laminated glass. Such effects are derived from a surface treatment giving excellent adhesive properties between each of the first resin layer and the second resin layer. Furthermore, since each of the plastic sheet according to the present invention and the method for manufacturing a plastic sheet according to the present invention is provided with the above-mentioned configuration, it is possible to enhance the penetration resistance of the resulting laminated glass. Such effects are derived from adhesive properties between each of the first resin layer and the second resin layer and the plastic sheet which are enhanced by a surface treatment and enable the inter-layer peeling (delamination) in laminated glass to become difficult to occur.

Although the surface treatment agent with which the surface of a plastic sheet is coated as above is not particularly limited, examples thereof include a silane-coupling surface treatment agent, an acryl-based surface treatment agent, a fluorine-based surface treatment agent, and the like. The kind of the surface treatment agent is appropriately selected so that the wetting tension is greater than or equal to 40 mN/m.

Although the surface treatment method by which the surface of a plastic sheet is modified as above is not particularly limited, examples thereof include a plasma treatment, a corona treatment, a UV ozone treatment, and the like. The treatment period of time and the treatment condition are appropriately adjusted so that the wetting tension is greater than or equal to 40 mN/m.

In this connection, when each of the first surface and the second surface is coated with a surface treatment agent, the thickness of a coating layer formed of the surface treatment agent with which the surface is coated is preferably greater than or equal to 0.1 μm and preferably less than or equal to 5 μm. When the thickness of the coating layer is greater than or equal to the above lower limit, adhesive properties between a first resin layer and a plastic sheet and adhesive properties between a second resin layer and a plastic sheet can be enhanced. In this connection, when the thickness of the coating layer is out of the above-mentioned range, there is a possibility that the durability of laminated glass is impaired. The basis weight of the surface treatment agent to be applied on each of the first surface and the second surface is preferably greater than 10 mg/m$^2$, more preferably greater than or equal to 100 mg/m$^2$ and preferably less than or equal to 5,000 mg/m$^2$. When the basis weight of the surface treatment agent is less than or equal to 10 mg/m$^2$, it is difficult to make the wetting tension greater than or equal to 40 mN/m.

(Interlayer Film for Laminated Glass)

In the interlayer film for laminated glass according to the present invention, the above-mentioned plastic sheet is used. The interlayer film for laminated glass according to the present invention is provided with a plastic layer constituted of the above-mentioned plastic sheet. The interlayer film for laminated glass according to the present invention is provided with the plastic layer and a first resin layer layered on a first surface of the plastic layer. The interlayer film for laminated glass according to the present invention is provided or not provided with a second resin layer layered on a second surface opposite to the first surface of the plastic layer.

Accordingly, the interlayer film for laminated glass according to the present invention is an interlayer film (1) which is provided with a plastic layer and a first resin layer and is not provided with a second resin layer or an interlayer film (2) which is provided with a plastic layer, a first resin layer and a second resin layer. The interlayer film for laminated glass according to the present invention may be the interlayer film (1) or may be the interlayer film (2).

Since the above-mentioned plastic sheet is used in the interlayer film for laminated glass according to the present invention, the inter-layer peeling is made to become difficult to occur at the time of preparing laminated glass, and furthermore, the penetration resistance of the resulting laminated glass can be enhanced.

Specifically, the interlayer film for laminated glass according to the present invention may have such a structure described below.

Figure 1:
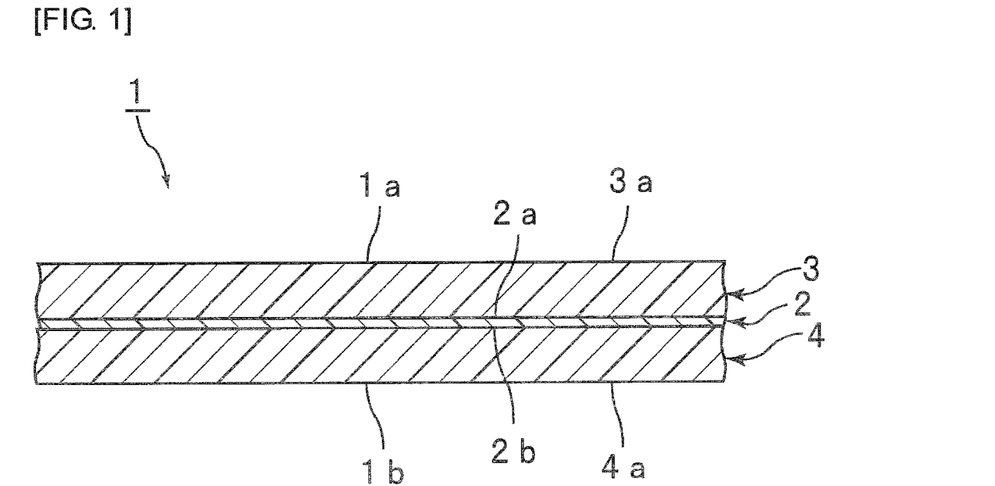
FIG. 1 is a sectional view showing an interlayer film for laminated glass in accordance with one embodiment of the present invention.

FIG. 1 shows an interlayer film for laminated glass used for laminated glass in accordance with one embodiment of the present invention schematically represented as a sectional view.

An interlayer film 1 shown in FIG. 1 is a multilayer interlayer film. The interlayer film 1 is used for obtaining laminated glass. The interlayer film 1 is an interlayer film for laminated glass. The interlayer film 1 is provided with a plastic layer 2, a first resin layer 3 layered on a first surface 2a of the plastic layer 2 and a second resin layer 4 layered on a second surface 2b opposite to the first surface 2a of the plastic layer 2. Each of the first resin layer 3 and the second resin layer 4 is directly layered on the plastic layer 2. The plastic layer 2 is an intermediate layer. In the present embodiment, the first resin layer 3 and the second resin layer 4 are surface layers. The plastic layer 2 is arranged between the first resin layer 3 and the second resin layer 4. The plastic layer 2 is sandwiched between the first resin layer 3 and the second resin layer 4. Accordingly, the interlayer film 1 has a multilayer structure in which the first resin layer 3, the plastic layer 2 and the second resin layer 4 are layered in this order. In this connection, without layering a second resin layer 4, an interlayer film in which a first resin layer 3 and a plastic layer 2 are layered may be obtained.

The Young's modulus of the plastic layer is preferably higher than or equal to 1 GPa, more preferably higher than or equal to 1.5 GPa and further preferably higher than or equal to 2 GPa. The Young's modulus is preferably lower than or equal to 10 GPa.

In this connection, in general, the Young's modulus of a resin layer containing a polyvinyl acetal resin and a plasticizer is lower than 1 GPa and specifically lower than or equal to 0.8 GPa. Accordingly, in general, the plastic layer with a Young's modulus of higher than or equal to 1 GPa is different from a resin layer containing a polyvinyl acetal resin and a plasticizer. The Young's modulus of each of the first resin layer and the second resin layer is preferably lower than 1 GPa and more preferably lower than or equal to 0.8 GPa. From the viewpoints of still further enhancing the processability at the time of preparing laminated glass and further effectively making laminated glass smaller broken pieces of glass at the time breakage thereof, the Young's modulus of each of the first resin layer and the second resin layer is preferably lower than 0.1 GPa and more preferably lower than or equal to 0.05 GPa.

The Young's moduli of the plastic layer, the first resin layer and the second resin layer are measured in the following manner.

The tensile test in accordance with JIS K7127 is performed to obtain a strain-stress curve at 23° C. The Young's modulus is defined by the inclination of a straight line portion of the strain-stress curve obtained.

(Ingredients to be Blended for Plastic Layer (Plastic Sheet))

[Thermoplastic Resin]

It is preferred that the plastic layer (plastic sheet) contain a thermoplastic resin. Examples of the thermoplastic resin contained in the plastic layer include linear polyolefins such as polyethylene, polypropylene, poly(4-methylpentene-1) and a polyacetal; alicyclic polyolefins such as a ring-opening metathesis polymer or an addition polymer of a kind of norbornene and an addition copolymer of a kind of norbornene and a kind of olefin; biodegradable polymers such as polylactic acid and polybutyl succinate; polyamides such as nylon 6, nylon 11, nylon 12 and nylon 66; aramid; polymethyl methacrylate, polyvinyl chloride, polyvinylidene chloride, polystyrene, polymethyl methacrylate-styrene copolymer, polycarbonate, polyesters such as polypropylene terephthalate, polyethylene terephthalate, polyethylene naphthalate, polybutylene terephthalate and polyethylene-2,6-naphthalate; polyether sulfone; polyether ether ketone; a modified polyphenylene ether; polyphenylene sulfide; polyether imide; polyimide; polyarylate; a polytetrafluoroethylene resin; a polytrifluoroethylene resin; a polychlorotrifluoroethylene resin; a tetrafluoroethylene-hexafluoropropylene copolymer; polyvinylidene fluoride and the like. One kind of the thermoplastic resin may be used alone, and two or more kinds thereof may be combinedly used.

From the viewpoints of making the inter-layer peeling in laminated glass become further difficult to occur and effectively enhancing the penetration resistance of laminated glass, it is preferred that the thermoplastic resin contained in the plastic layer be polyethylene terephthalate.

From the viewpoints of making the inter-layer peeling in laminated glass become further difficult to occur and effectively enhancing the penetration resistance of laminated glass, it is preferred that the plastic layer contain a thermoplastic resin other than the polyvinyl acetal resin, and it is preferred that the plastic layer not contain a polyvinyl acetal resin. When the plastic layer contains a polyvinyl acetal resin, the content of the polyvinyl acetal resin in 100% by weight of the plastic layer is preferably less than or equal to 20% by weight, more preferably less than or equal to 10% by weight and further preferably less than or equal to 5% by weight. It is preferred that the content of the polyvinyl acetal resin be small. It is preferred that the plastic layer not contain a polyvinyl acetal resin or it is preferred that the plastic layer contain a polyvinyl acetal resin in an amount less than or equal to the above upper limit.

From the viewpoints of making the inter-layer peeling in laminated glass become further difficult to occur and effectively enhancing the penetration resistance of laminated glass, it is preferred that the plastic layer not contain a plasticizer. When the plastic layer contains a plasticizer, the content of the plasticizer in 100% by weight of the plastic layer is preferably less than or equal to 20% by weight, more preferably less than or equal to 10% by weight and further preferably less than or equal to 5% by weight.

[Other Ingredients]

It is preferred that the plastic layer contain an ultraviolet ray screening agent, and it is preferred that the plastic layer contain an oxidation inhibitor. In this connection, the kind of each of the ultraviolet ray screening agent and the oxidation inhibitor which can be used in the plastic layer is the same as each of the ultraviolet ray screening agent and the oxidation inhibitor which can be used in the first resin layer and the second resin layer described below.

The plastic layer may contain additives such as a light stabilizer, a flame retardant, an antistatic agent, a pigment, a dye an adhesive force regulating agent, a moisture-resistance improving agent and a fluorescent brightening agent, as necessary. One kind of these additives may be used alone, and two or more kinds thereof may be combinedly used.

(Ingredients to be Blended for First Resin Layer and Second Resin Layer)

[Thermoplastic Resin]

It is preferred that each of the first resin layer and the second resin layer contain a thermoplastic resin. The thermoplastic resin is not particularly limited. As the thermoplastic resin, a conventionally known thermoplastic resin can be used. One kind of the thermoplastic resin may be used alone, and two or more kinds thereof may be combinedly used. The thermoplastic resin in the first resin layer and the thermoplastic resin in the second resin layer may be the same as or different from each other.

Examples of the thermoplastic resin include a polyvinyl acetal resin, an ethylene-vinyl acetate copolymer resin, an ethylene-acryl copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of each of the first resin layer and the second resin layer to a laminated glass member and another layer such as a plastic layer is further heightened.

For example, the polyvinyl acetal resin can be produced by acetalizing polyvinyl alcohol with an aldehyde. For example, the polyvinyl alcohol can be produced by saponifying polyvinyl acetate. The saponification degree of the polyvinyl alcohol generally lies within the range of 70 to 99.8% by mole.

The average polymerization degree of the polyvinyl alcohol is preferably greater than or equal to 200, more preferably greater than or equal to 500, preferably less than or equal to 5000, more preferably less than or equal to 4000, further preferably less than or equal to 3500, especially preferably less than or equal to 3000 and most preferably less than or equal to 2500. When the average polymerization degree is greater than or equal to the above lower limit, the penetration resistance of laminated glass is further enhanced. When the average polymerization degree is less than or equal to the above upper limit, formation of an interlayer film is facilitated. In this connection, the average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, as the aldehyde, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be combinedly used.

The content of the hydroxyl group (the amount of hydroxyl groups) of the polyvinyl acetal resin is preferably greater than or equal to 15% by mole, more preferably greater than or equal to 18% by mole, further preferably greater than or equal to 20% by mole, especially preferably greater than or equal to 28% by mole, preferably less than or equal to 40% by mole, more preferably less than or equal to 35% by mole and further preferably less than or equal to 32% by mole. When the content of the hydroxyl group is greater than or equal to the above lower limit, the adhesive force of the interlayer film is further heightened. Moreover, when the content of the hydroxyl group is less than or equal to the above upper limit, the flexibility of the interlayer film is enhanced and the handling of the interlayer film is facilitated. Because the inter-layer peeling can be further prevented and the penetration resistance of laminated glass is further enhanced, it is preferred that the content of the hydroxyl group of the polyvinyl acetal resin be greater than or equal to 29% by mole.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6726 "Testing methods for polyvinyl alcohol" to be determined.

The acetylation degree (the amount of acetyl groups) of the polyvinyl acetal resin is preferably greater than or equal to 0.1% by mole, more preferably greater than or equal to 0.3% by mole, further preferably greater than or equal to 0.5% by mole, preferably less than or equal to 30% by mole, more preferably less than or equal to 25% by mole, further preferably less than or equal to 20% by mole, especially preferably less than or equal to 15% by mole and most preferably less than or equal to 3% by mole. When the acetylation degree is greater than or equal to the above lower limit, the compatibility between the polyvinyl acetal resin and a plasticizer is heightened. When the acetylation degree is less than or equal to the above upper limit, with regard to the interlayer film and laminated glass, the moisture resistance thereof is enhanced.

The acetylation degree is a mole fraction, represented in percentage, obtained by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain. For example, the amount of ethylene groups to which the acetal group is bonded can be measured in accordance with JIS K6728 "Testing methods for polyvinyl butyral".

The acetalization degree of the polyvinyl acetal resin (the butyralization degree when a polyvinyl butyral resin) is preferably greater than or equal to 60% by mole, more preferably greater than or equal to 63% by mole, preferably less than or equal to 85% by mole, more preferably less than or equal to 75% by mole and further preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a mole fraction, represented in percentage, obtained by dividing the amount of ethylene groups to which the acetal group is bonded by the total amount of ethylene groups in the main chain.

The acetalization degree can be calculated by a method in accordance with JIS K6728 "Testing methods for polyvinyl butyral".

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". When the polyvinyl acetal resin is a polyvinyl butyral resin, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral".

[Plasticizer]

It is preferred that the first resin layer contain a plasticizer. It is preferred that the second resin layer contain a plasticizer. When the thermoplastic resin in each of the first resin layer and the second resin layer is a polyvinyl acetal resin, it is especially preferred that each of the first resin layer and the second resin layer contain a plasticizer. By the use of the plasticizer, the adhesive force of each of the first resin layer and the second resin layer is further heightened.

The plasticizer is not particularly limited. As the plasticizer, a conventionally known plasticizer can be used. One kind of the plasticizer may be used alone, and two or more kinds thereof may be combinedly used.

Examples of the plasticizer include organic ester plasticizers such as a monobasic organic acid ester and a polybasic organic acid ester, phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited and examples thereof include a glycol ester obtained by the reaction of a glycol with a monobasic organic acid, an ester of triethylene glycol or tripropylene glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid, and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid, and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic acid alkyd, a mixture of a phosphoric acid ester and an adipic acid ester, and the like. Organic ester plasticizers other than these may be used.

The organic phosphate plasticizer is not particularly limited and examples thereof include tributoxyethyl phosphate, isodecyl phenyl phosphate, triisopropyl phosphate, and the like.

It is preferred that the plasticizer be a diester plasticizer represented by the following formula (1).

[Chemical 1]

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include at least one kind among triethylene glycol di-2-ethylhexanoate (3GO) and triethylene glycol di-2-ethylbutyrate (3GH), and it is more preferred that the plasticizer include triethylene glycol di-2-ethylhexanoate.

The content of the plasticizer is not particularly limited. In each of the first resin layer and the second resin layer, relative to 100 parts by weight of the thermoplastic resin, the content of the plasticizer is preferably greater than or equal to 25 parts by weight, more preferably greater than or equal to 30 parts by weight, further preferably greater than or equal to 35 parts by weight, preferably less than or equal to 75 parts by weight, more preferably less than or equal to 60 parts by weight, further preferably less than or equal to 50 parts by weight, especially preferably less than or equal to 45 parts by weight and most preferably less than or equal to 40 parts by weight. When the content of the plasticizer is greater than or equal to the above lower limit, the penetration resistance of laminated glass is further enhanced. When the content of the plasticizer is less than or equal to the above upper limit, the transparency of the interlayer film is further enhanced.

[Heat Shielding Compound]

Ingredient X:

It is preferred that each of the first resin layer and the second resin layer contain a heat shielding compound. It is preferred that each of the first resin layer and the second resin layer contain at least one kind of Ingredient X among a phthalocyanine compound, a naphthalocyanine compound and an anthracyanine compound. It is preferred that each of the first resin layer and the second resin layer contain at least one kind of Ingredient X among a phthalocyanine compound, a naphthalocyanine compound and an anthracyanine compound or contain heat shielding particles described below. The Ingredient X is a heat shielding compound. By using the Ingredient X in at least one layer among the interlayer film as a whole, infrared rays (heat rays) can be effectively cut off.

The Ingredient X is not particularly limited. As the Ingredient X, conventionally known phthalocyanine compound, naphthalocyanine compound and anthracyanine compound can be used. One kind of the Ingredient X may be used alone, and two or more kinds thereof may be combinedly used.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

When the first resin layer or the second resin layer contains the Ingredient X, in 100% by weight of each of the first resin layer and the second resin layer, the content of the Ingredient X is preferably greater than or equal to 0.001% by weight, more preferably greater than or equal to 0.005% by weight, further preferably greater than or equal to 0.01% by weight, especially preferably greater than or equal to 0.02% by weight, preferably less than or equal to 0.2% by weight, more preferably less than or equal to 0.1% by weight, further preferably less than or equal to 0.05% by weight and especially preferably less than or equal to 0.04% by weight. When the content of the Ingredient X in each of the first resin layer and the second resin layer is greater than or equal to the above lower limit and less than or equal to the above upper limit, the heat shielding properties are sufficiently heightened and the visible light transmittance is sufficiently heightened. For example, it is possible to make the visible light transmittance greater than or equal to 70%.

Heat Shielding Particles:

It is preferred that each of the first resin layer and the second resin layer contain heat shielding particles. The heat shielding particle is a heat shielding compound. By using a heat shielding compound in at least one layer among the whole interlayer film, infrared rays (heat rays) can be effectively cut off.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal. One kind of the heat shielding particles may be used alone, and two or more kinds thereof may be combinedly used.

The energy amount of an infrared ray with a wavelength greater than or equal to 780 nm which is longer than that of visible light is small as compared with an ultraviolet ray. However, the thermal action of infrared rays is large, and when infrared rays are absorbed into a substance once, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film, the tungsten oxide particles represented by the following formula (X1) or the following formula (X2) are suitably used.

$$W_y O_z \qquad \text{Formula (X1)}$$

In the foregoing formula (X1), W represents tungsten, O represents oxygen, and y and z satisfy the equation of 2.0<z/y<3.0.

$$M_xW_yO_z \quad \text{Formula (X2)}$$

In the foregoing formula (X2), M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re, W represents tungsten, O represents oxygen, and x, y and z satisfy the equations of $0.001 \leq x/y \leq 1$ and $2.0 < z/y \leq 3.0$.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably greater than or equal to 0.01 μm, more preferably greater than or equal to 0.02 μm, preferably less than or equal to 0.1 μm and more preferably less than or equal to 0.05 μm. When the average particle diameter is greater than or equal to the above lower limit, the heat ray shielding properties are sufficiently heightened. When the average particle diameter is less than or equal to the above upper limit, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

When the first resin layer or the second resin layer contains the heat shielding particles, in 100% by weight of each of the first resin layer and the second resin layer, the content of the heat shielding particles is preferably greater than or equal to 0.01% by weight, more preferably greater than or equal to 0.1% by weight, further preferably greater than or equal to 1% by weight, especially preferably greater than or equal to 1.5% by weight, preferably less than or equal to 6% by weight, more preferably less than or equal to 5.5% by weight, further preferably less than or equal to 4% by weight, especially preferably less than or equal to 3.5% by weight and most preferably less than or equal to 3.0% by weight. When the content of the heat shielding particles is greater than or equal to the above lower limit and less than or equal to the above upper limit, the heat shielding properties are sufficiently heightened and the visible light transmittance is sufficiently heightened.

When the first resin layer or the second resin layer contains the heat shielding particles, it is preferred that each of the first resin layer and the second resin layer contain the heat shielding particles in a proportion of 0.1 to 12 g/m². When the proportion of the heat shielding particles lies within the above-mentioned range, the heat shielding properties are sufficiently heightened and the visible light transmittance is sufficiently heightened. The proportion of the heat shielding particles is preferably greater than or equal to 0.5 g/m², more preferably greater than or equal to 0.8 g/m², further preferably greater than or equal to 1.5 g/m², especially preferably greater than or equal to 3 g/m², preferably less than or equal to 11 g/m², more preferably less than or equal to 10 g/m², further preferably less than or equal to 9 g/m² and especially preferably less than or equal to 7 g/m². When the proportion is greater than or equal to the above lower limit, the heat shielding properties are further heightened. When the proportion is less than or equal to the above upper limit, the visible light transmittance is further heightened.

[Ultraviolet Ray Screening Agent]

It is preferred that the first resin layer contain an ultraviolet ray screening agent. It is preferred that the second resin layer contain an ultraviolet ray screening agent. It is more preferred that both of the first resin layer and the second resin layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be combinedly used.

Examples of the ultraviolet ray screening agent include an ultraviolet ray absorber. It is preferred that the ultraviolet ray screening agent be an ultraviolet ray absorber.

Examples of a common ultraviolet ray screening agent which is heretofore widely known include a metal-based ultraviolet ray screening agent, a metal oxide-based ultraviolet ray screening agent, a benzotriazole-based ultraviolet ray screening agent (a benzotriazole compound), a benzophenone-based ultraviolet ray screening agent (a benzophenone compound), a triazine-based ultraviolet ray screening agent (a triazine compound), a malonic acid ester-based ultraviolet ray screening agent (a malonic acid ester compound), an oxanilide-based ultraviolet ray screening agent (an oxanilide compound), a benzoate-based ultraviolet ray screening agent (a benzoate compound) and the like.

Examples of the metal-based ultraviolet ray screening agent include platinum particles, particles in which the surface of platinum particles is coated with silica, palladium particles, particles in which the surface of palladium particles is coated with silica, and the like. It is preferred that the ultraviolet ray screening agent not be heat shielding particles.

Examples of the metal oxide-based ultraviolet ray screening agent include zinc oxide, titanium oxide, cerium oxide, and the like. Furthermore, with regard to the metal oxide-based ultraviolet ray screening agent, the surface thereof may be coated with any material. Examples of the coating material for the surface of the metal oxide-based ultraviolet ray screening agent include an insulating metal oxide, a hydrolyzable organosilicon compound, a silicone compound, and the like.

Examples of the insulating metal oxide include silica, alumina, zirconia and the like. For example, the insulating metal oxide has a band-gap energy greater than or equal to 5.0 eV.

Examples of the benzotriazole-based ultraviolet ray screening agent include benzotriazole-based ultraviolet ray screening agents such as 2-(2'-hydroxy-5'-methylphenyl)

benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the benzotriazole-based ultraviolet ray screening agent be a benzotriazole-based ultraviolet ray screening agent containing halogen atoms, and it is more preferred that the benzotriazole-based ultraviolet ray screening agent be a benzotriazole-based ultraviolet ray screening agent containing chlorine atoms, since those are excellent in ultraviolet ray absorbing performance.

Examples of the benzophenone-based ultraviolet ray screening agent include octabenzone ("Chimassorb 81" available from BASF Japan Ltd.), and the like.

Examples of the triazine-based ultraviolet ray screening agent include 2-(4,6-diphenyl-1,3,5-triazine-2-yl)-5-[(hexyl)oxy]-phenol ("Tinuvin 1577FF" available from BASF Japan Ltd.), and the like.

Examples of the malonic acid ester-based ultraviolet ray screening agent include dimethyl 2-(p-methoxybenzylidene) malonate, tetraethyl-2,2-(1,4-phenylenedimethylidene)bis-malonate, 2-(p-methoxybenzylidene)-bis(1,2,2,6,6-pentamethyl-4-piperidinyl)malonate, and the like.

Examples of a commercial product of the malonic acid ester-based ultraviolet ray screening agent include Hostavin B-CAP, Hostavin PR-25 and Hostavin PR-31 (any of these is available from Clariant Japan K.K.).

Examples of the oxanilide-based ultraviolet ray screening agent include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the benzoate-based ultraviolet ray screening agent include 2,4-di-tert-butylphenyl-3,5-di-tert-butyl-4-hydroxybenzoate ("Tinuvin 120" available from BASF Japan Ltd.), and the like.

With regard to the interlayer film and laminated glass, in order to suppress the lowering in visible light transmittance thereof after the lapse of time, it is preferred that the ultraviolet ray screening agent be 2-(2'-hydroxy-3'-t-butyl-5-methylphenyl)-5-chlorobenzotriazole ("Tinuvin 326" available from BASF Japan Ltd.) or 2-(2'-hydroxy-3',5'-di-amylphenyl)benzotriazole ("Tinuvin 328" available from BASF Japan Ltd.), and the ultraviolet ray screening agent may be 2-(2'-hydroxy-3'-t-butyl-5-methylphenyl)-5-chlorobenzotriazole.

When each of the first resin layer and the second resin layer contains the ultraviolet ray screening agent, in 100% by weight of each of the first resin layer and the second resin layer, the content of the ultraviolet ray screening agent is preferably greater than or equal to 0.1% by weight, more preferably greater than or equal to 0.2% by weight, further preferably greater than or equal to 0.3% by weight, especially preferably greater than or equal to 0.5% by weight, preferably less than or equal to 2.5% by weight, more preferably less than or equal to 2% by weight, further preferably less than or equal to 1% by weight and especially preferably less than or equal to 0.8% by weight. When the content of the ultraviolet ray screening agent is greater than or equal to the above lower limit and less than or equal to the above upper limit, the lowering in visible light transmittance after the lapse of time is further suppressed. In particular, by setting the content of the ultraviolet ray screening agent to be greater than or equal to 0.2% by weight in 100% by weight of each of the first resin layer and the second resin layer, with regard to the interlayer film and laminated glass, the lowering in visible light transmittance thereof after the lapse of time can be significantly suppressed.

[Oxidation Inhibitor]

It is preferred that the first resin layer contain an oxidation inhibitor. It is preferred that the second resin layer contain an oxidation inhibitor. It is preferred that both of the first resin layer and the second resin layer contain an oxidation inhibitor. One kind of the oxidation inhibitor may be used alone, and two or more kinds thereof may be combinedly used.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate] methane, 1,3,3-tris-(2-methyl-4-hydroxy-5-t-butylphenol) butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl)phosphite, bis(2,4-di-t-butyl-6-methylphenyl)ethyl ester phosphorous acid, tris(2,4-di-t-butylphenyl)phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

When each of the first resin layer and the second resin layer contains the oxidation inhibitor, in 100% by weight of each of the first resin layer and the second resin layer, the content of the oxidation inhibitor is preferably greater than or equal to 0.1% by weight, preferably less than or equal to 2% by weight and more preferably less than or equal to 1.8% by weight. When the content of the oxidation inhibitor is greater than or equal to the above lower limit, with regard to the interlayer film and laminated glass, high visible light transmittance thereof is maintained over a longer period of time. When the content of the oxidation inhibitor is less than or equal to the above upper limit, an effect commensurate with the addition of an oxidation inhibitor becomes easy to be attained.

[Other Ingredients]

Each of the first resin layer and the second resin layer may include additives such as a light stabilizer, a flame retardant, an antistatic agent, a pigment, a dye, an adhesive force regulating agent, a moisture-resistance improving agent and a fluorescent brightening agent, as necessary. One kind of these additives may be used alone, and two or more kinds thereof may be combinedly used.

(Other Details of Interlayer Film for Laminated Glass)

It is preferred that the interlayer film for laminated glass be arranged between a first laminated glass member and a second laminated glass member to be used.

The thickness of the interlayer film for laminated glass is not particularly limited. From the viewpoint of the practical aspect and the viewpoint of sufficiently heightening the heat shielding properties, the thickness of the interlayer film is preferably greater than or equal to 0.1 mm, more preferably greater than or equal to 0.25 mm, preferably less than or equal to 3 mm and more preferably less than or equal to 1.5 mm. When the thickness of the interlayer film is greater than or equal to the above lower limit, the penetration resistance of laminated glass is enhanced.

The thickness of the plastic layer is preferably greater than or equal to 5 μm, more preferably greater than or equal to 30 μm, preferably less than or equal to 300 μm and more preferably less than or equal to 150 μm. When the thickness of the plastic layer is greater than or equal to the above lower limit, the inter-layer peeling in laminated glass becomes further difficult to occur and the penetration resistance of laminated glass is effectively enhanced. When the thickness of the plastic layer is less than or equal to the above upper limit, the thicknesses of the first resin layer and the second resin layer can be made relatively thick and the performance derived from the first resin layer and the second resin layer can be further exerted.

The thickness of each of the first resin layer and the second resin layer is preferably greater than or equal to 0.1 mm, more preferably greater than or equal to 0.2 mm, further preferably greater than or equal to 0.25 mm, especially preferably greater than or equal to 0.3 mm, preferably less than or equal to 1.0 mm, more preferably less than or equal to 0.6 mm, still more preferably less than or equal to 0.5 mm, further preferably less than or equal to 0.45 mm and especially preferably less than or equal to 0.4 mm. When the thickness of each of the first resin layer and the second resin layer is greater than or equal to the above lower limit, the penetration resistance of laminated glass is further enhanced. When the thickness of each of the first resin layer and the second resin layer is less than or equal to the above upper limit, the transparency of laminated glass is further enhanced.

(Production Method of Interlayer Film for Laminated Glass)

The production method of the interlayer film for laminated glass according to the present invention is not particularly limited. As the production method of the interlayer film, a conventionally known method can be used.

It is preferred that the production method of the interlayer film for laminated glass according to the present invention include the step of subjecting the plastic layer and the first resin layer to thermocompression bonding by a roll-to-roll process under conditions of a heating temperature of higher than or equal to 65° C. and lower than or equal to 150° C., a pressure at the time of compression bonding of greater than or equal to 0.05 MPa and less than or equal to 0.5 MPa and a tensile force at the time of transportation of less than or equal to 100 N to obtain an interlayer film for laminated glass provided with the plastic layer and the first resin layer layered on a first surface of the plastic layer.

It is preferred that the production method of the interlayer film for laminated glass according to the present invention include the step of subjecting the plastic layer, the first resin layer and the second resin layer to thermocompression bonding by a roll-to-roll process under conditions of a heating temperature of higher than or equal to 65° C. and lower than or equal to 150° C., a pressure at the time of compression bonding of greater than or equal to 0.05 MPa and less than or equal to 0.5 MPa and a tensile force at the time of transportation of less than or equal to 100 N to obtain an interlayer film for laminated glass provided with the plastic layer, the first resin layer layered on a first surface of the plastic layer and a second resin layer layered on a second surface opposite to the first surface of the plastic layer.

In this connection, when an interlayer film provided with the first resin layer, the plastic layer and the second resin layer is obtained, the three layers may be layered at one time, and two layers are layered and then the remaining layer may be layered.

The heating temperature is preferably higher than or equal to 65° C. and preferably lower than or equal to 150° C. When the heating temperature is higher than or equal to the above lower limit, the adhesivity of each of the first resin layer and the second resin layer to the plastic layer is further improved. When the heating temperature is lower than or equal to the above upper limit, softening of the first resin layer and the second resin layer is suppressed and the lamination aptitude is further improved.

The pressure at the time of compression bonding is preferably greater than or equal to 0.05 MPa and preferably less than or equal to 0.5 MPa. When the pressure at the time of compression bonding is greater than or equal to the above lower limit, the adhesivity of each of the first resin layer and the second resin layer to the plastic layer is further improved. When the pressure at the time of compression bonding is less than or equal to the above upper limit, the occurrence of lamination wrinkles is suppressed and the lamination aptitude is further improved.

The tensile force at the time of transportation is preferably greater than or equal to 10 N, preferably less than or equal to 200 N and more preferably less than or equal to 100 N. For the purpose of obtaining the interlayer film for laminated glass according to the present invention, the tensile force at the time of transportation may be less than or equal to 200 N, but it is preferred that the tensile force at the time of transportation be less than or equal to 100 N. When the tensile force at the time of transportation is greater than or equal to the above lower limit, the slack at the time of transportation of the first resin layer, the second resin layer and the plastic layer in a lamination process is suppressed, wrinkles of layers at the time of being bonded together are suppressed and the lamination aptitude is further improved. When the tensile force at the time of transportation is less than or equal to the above upper limit, the elongation of the first resin layer and the second resin layer is suppressed, the variation in film width is suppressed and the lamination aptitude is further improved.

Moreover, as the production method of the plastic layer, the first resin layer and the second resin layer, a conventionally known method can be used. Examples thereof include a production method of kneading respective ingredients described above and forming the kneaded product into respective layers, and the like. A production method of extrusion-molding is preferred because the method is suitable for continuous production.

The method for kneading is not particularly limited. Examples of this method include a method using an extruder, a plastograph, a kneader, a banbury mixer, a calender roll, or the like. Of these, a method using an extruder is preferred and a method using a twin screw extruder is more preferred because the methods are suitable for continuous production.

Because the interlayer film is excellent in production efficiency, it is preferred that respective polyvinyl acetal resins contained in the first resin layer and the second resin layer be the same as each other, it is more preferred that respective polyvinyl acetal resins contained therein be the same as each other and respective plasticizers contained therein be the same as each other, and it is further preferred that the first resin layer and the second resin layer be formed from the same resin composition as each other.

(Laminated Glass)

The laminated glass according to the present invention is provided with a first laminated glass member, a second laminated glass member and an interlayer film for laminated glass described above. The interlayer film for laminated glass is arranged between the first laminated glass member and the second laminated glass member. The first laminated glass member is arranged on the outside of the first resin layer in the interlayer film. The second laminated glass member is arranged on the outside of the second resin layer in the interlayer film. In this connection, when the interlayer film is not provided with the second resin layer, the second laminated glass member may be layered on a surface opposite to the first resin layer of the plastic layer.

Figure 2:
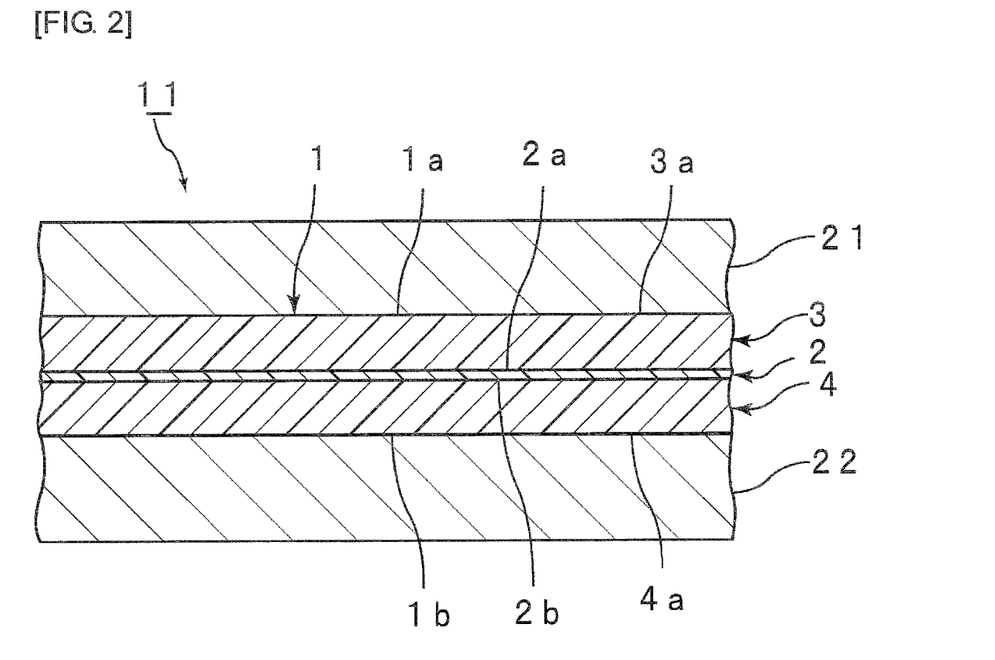
FIG. 2 is a sectional view showing laminated glass prepared with an interlayer film for laminated glass in accordance with one embodiment of the present invention.

FIG. 2 shows an example of laminated glass prepared with an interlayer film for laminated glass in accordance with one embodiment of the present invention represented as a sectional view.

Laminated glass 11 shown in FIG. 2 is provided with an interlayer film 1, a first laminated glass member 21 and a second laminated glass member 22. The interlayer film 1 is sandwiched between the first laminated glass member 21 and the second laminated glass member 22. The first laminated glass member 21 is layered on a first surface 1*a* of the interlayer film 1. The second laminated glass member 22 is layered on a second surface 1*b* opposite to the first surface 1*a* of the interlayer film 1. The first laminated glass member 21 is layered on an outer surface 3*a* of a first resin layer 3 in the interlayer film 1. The second laminated glass member 22 is layered on an outer surface 4*a* of a second resin layer 4 in the interlayer film 1.

Examples of the laminated glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used. It is preferred that each of the first laminated glass member and the second laminated glass member be a glass plate or a PET (polyethylene terephthalate) film and the interlayer film include at least one glass plate as the first laminated glass member or the second laminated glass member. It is especially preferred that both of the first laminated glass member and the second laminated glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first laminated glass member and the second laminated glass member are not particularly limited, the thickness is preferably greater than or equal to 1 mm and preferably less than or equal to 5 mm. When the laminated glass member is a glass plate, the thickness of the glass plate is preferably greater than or equal to 1 mm and preferably less than or equal to 5 mm. When the laminated glass member is a PET film, the thickness of the PET film is preferably greater than or equal to 0.03 mm and preferably less than or equal to 0.5 mm.

The production method of the laminated glass is not particularly limited. For example, the interlayer film is sandwiched between the first and second laminated glass members, and the air remaining between the first laminated glass member and the interlayer film and between the second laminated glass member and the interlayer film is removed by allowing the members to pass through a pressing roll or by putting the members into a rubber bag and sucking the contents under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings and the like. It is preferred that the laminated glass be laminated glass for building or for vehicles, and it is more preferred that the laminated glass be laminated glass for vehicles. The laminated glass can also be used for applications other than these applications. The laminated glass can be used for a windshield, side glass, rear glass or roof glass, and the like of an automobile. Since the laminated glass is high in visible light transmittance, the laminated glass is suitably used for automobiles.

Hereinafter, the present invention will be described in more detail with reference to examples. The present invention is not limited only to the following examples.

(Materials for First Resin Layer and Second Resin Layer)

Thermoplastic Resin:

Polyvinyl butyral resin (PVB1) (the content of the hydroxyl group of 22% by mole, the acetylation degree of 13% by mole, the butyralization degree of 65% by mole, the average polymerization degree of 2,300)

Polyvinyl butyral resin (PVB2) (the content of the hydroxyl group of 30.5% by mole, the acetylation degree of 1% by mole, the butyralization degree of 68.5% by mole, the average polymerization degree of 1,700)

Plasticizer:

3GO (triethylene glycol di-2-ethylhexanoate)

Other Ingredients:

BHT (an oxidation inhibitor, 2,6-di-t-butyl-p-cresol)

T-326 (an ultraviolet ray screening agent, 2-(2'-hydroxy-3'-t-butyl-5-methylphenyl)-5-chlorobenzotriazole, "Tinuvin 326" available from BASF Japan Ltd.)

(Resin Layer)

Resin Layer A:

To 100 parts by weight of a polyvinyl butyral resin (PVB1), 40 parts by weight of a plasticizer (3GO), 0.5 part by weight of an ultraviolet ray screening agent (T-326) and 0.5 part by weight of an oxidation inhibitor (BHT) were added and thoroughly kneaded with a mixing roll to obtain a composition. The composition obtained was extruded by an extruder to obtain a single-layered resin layer A with a thickness of 380 μm.

Resin Layer B:

To 100 parts by weight of a polyvinyl butyral resin (PVB2), 40 parts by weight of a plasticizer (3GO), 0.5 part by weight of an ultraviolet ray screening agent (T-326) and 0.5 part by weight of an oxidation inhibitor (BHT) were added and thoroughly kneaded with a mixing roll to obtain a composition. The composition obtained was extruded by an extruder to obtain a single-layered resin layer B with a thickness of 380 μm.

(Plastic Layer)

Plastic Layer A:

On each of the first surface and the second surface of a polyethylene terephthalate film ("T60 Lumirror" available from Toray Industries, Inc., 75 μm in thickness, the wetting tension of each of the first surface and the second surface of 30 mN/m), a silane coupling agent having an amino group ("KBM-903" available from Shin-Etsu Chemical Co., Ltd.) was applied by means of a bar coater so that the thickness thereof becomes 1 μm (the basis weight becomes 1,000 mg/m$^2$) to obtain a plastic sheet (Plastic layer A) with a wetting tension of each of the first surface and the second surface, which were subjected to the coating treatment, of 55 mN/m.

Plastic Layer B:

On each of the first surface and the second surface of a polyethylene terephthalate film ("T60 Lumirror" available from Toray Industries, Inc., 75 μm in thickness, the wetting tension of each of the first surface and the second surface of 30 mN/m), a silane coupling agent having an epoxy group ("KBM-403" available from Shin-Etsu Chemical Co., Ltd.) was applied so that the thickness thereof becomes 1 μm (the basis weight becomes 1,000 mg/m$^2$) to obtain a plastic sheet (Plastic layer B) with a wetting tension of each of the first surface and the second surface, which were subjected to the coating treatment, of 45 mN/m.

Plastic Layer C:

On each of the first surface and the second surface of a polyethylene terephthalate film ("T60 Lumirror" available from Toray Industries, Inc., 75 μm in thickness, the wetting tension of each of the first surface and the second surface of 30 mN/m), a silane coupling agent having an isocyanate group ("KBM-9007" available from Shin-Etsu Chemical Co., Ltd.) was applied so that the thickness thereof becomes 1 mm (the basis weight becomes 1,000 mg/m$^2$) to obtain a plastic sheet (Plastic layer C) with a wetting tension of each of the first surface and the second surface, which were subjected to the coating treatment, of 43 mN/m.

Plastic Layer D:

On each of the first surface and the second surface of a polyethylene terephthalate film ("T60 Lumirror" available from Toray Industries, Inc., 75 μm in thickness, the wetting tension of each of the first surface and the second surface of 30 mN/m), an acryl-based surface-conditioning agent ("BYK-3441" available from BYK Japan KK) was applied by means of a bar coater so that the thickness thereof becomes 1 μm (the basis weight becomes 1,000 mg/m$^2$) to obtain a plastic sheet (Plastic layer D) with a wetting tension of each of the first surface and the second surface of 55 mN/m.

Plastic Layer a:

On each of the first surface and the second surface of a polyethylene terephthalate film ("T60 Lumirror" available from Toray Industries, Inc., 75 μm in thickness, the wetting tension of each of the first surface and the second surface of 30 mN/m), a fluorine-based surface-conditioning agent ("MEGAFACE F-444" available from DIC Corporation) was applied by means of a bar coater so that the thickness thereof becomes 1 μm (the basis weight becomes 1,000 mg/m$^2$) to obtain a plastic sheet (Plastic layer a) with a wetting tension of each of the first surface and the second surface of 18 mN/m.

Plastic Layer b:

On each of the first surface and the second surface of a polyethylene terephthalate film ("T60 Lumirror" available from Toray Industries, Inc., 75 μm in thickness, the wetting tension of each of the first surface and the second surface of 30 mN/m), a halogen-based surface-conditioning agent was applied by means of a bar coater so that the thickness thereof becomes 1 μm (the basis weight becomes 75 mg/m$^2$) to obtain a plastic sheet (Plastic layer b) with a wetting tension of each of the first surface and the second surface of 30 mN/m.

Plastic Layer c:

On each of the first surface and the second surface of a polyethylene terephthalate film ("T60 Lumirror" available from Toray Industries, Inc., 75 μm in thickness, the wetting tension of each of the first surface and the second surface of 30 mN/m), a silane coupling agent having an amino group ("KBM-903" available from Shin-Etsu Chemical Co., Ltd.) was applied by means of a bar coater so that the thickness thereof becomes 0.01 μm (the basis weight becomes 10 mg/m$^2$) to obtain a plastic sheet (Plastic layer c) with a wetting tension of each of the first surface and the second surface of 35 mN/m.

Plastic Layer AA:

Each of the first surface and the second surface of a polyethylene terephthalate film ("T60 Lumirror" available from Toray Industries, Inc., 75 μm in thickness, the wetting tension of each of the first surface and the second surface of 30 mN/m) was subjected to a corona treatment under the condition of a discharge amount of 30 Wmin/m$^2$ to obtain a plastic sheet (Plastic layer AA) with a wetting tension of each of the first surface and the second surface of 58 mN/m.

Plastic Layer BB:

Each of the first surface and the second surface of a polyethylene terephthalate film ("T60 Lumirror" available from Toray Industries, Inc., 75 μm in thickness, the wetting tension of each of the first surface and the second surface of 30 mN/m) was subjected to a plasma treatment under the condition of a treatment period of time of 5 seconds using a plasma treatment apparatus (available from Nissin Inc.) to obtain a plastic sheet (Plastic layer BB) with a wetting tension of each of the first surface and the second surface of 46 mN/m.

Plastic Layer CC:

Each of the first surface and the second surface of a polyethylene terephthalate film ("T60 Lumirror" available from Toray Industries, Inc., 75 μm in thickness, the wetting tension of each of the first surface and the second surface of 30 mN/m) was subjected to a UV ozone treatment under the condition of a treatment period of time of 5 seconds using a UV ozone treatment apparatus (available from SEN LIGHTS Corporation) to obtain a plastic sheet (Plastic layer CC) with a wetting tension of each of the first surface and the second surface of 48 mN/m.

Plastic Layer AC:

The first surface of a polyethylene terephthalate film ("T60 Lumirror" available from Toray Industries, Inc., 75 μm in thickness, the wetting tension of each of the first surface and the second surface of 30 mN/m) was surface-treated in the same manner as that for Plastic layer A and the second surface thereof was surface-treated in the same manner as that for Plastic layer C to obtain a plastic sheet (Plastic layer AC) with a wetting tension of the first surface of 55 mN/m and a wetting tension of the second surface of 43 mN/m.

Plastic Layer aa:

Each of the first surface and the second surface of a polyethylene terephthalate film ("T60 Lumirror" available from Toray Industries, Inc., 75 μm in thickness, the wetting tension of each of the first surface and the second surface of 30 mN/m) was subjected to a plasma treatment under the condition of a treatment period of time of 0.5 second using a plasma treatment apparatus (available from Nissin Inc.) to obtain a plastic sheet (Plastic layer aa) with a wetting tension of each of the first surface and the second surface of 30 mN/m.

Plastic Layer Std (Untreated):

A polyethylene terephthalate film ("T60 Lumirror" available from Toray Industries, Inc., 75 μm in thickness, the wetting tension of each of the first surface and the second surface of 30 mN/m)

Examples 1 to 16 and Comparative Examples 1 to 10

(1) Preparation of Interlayer Film

In Examples 1 to 16 and Comparative Examples 1 to 10, an interlayer film having a three-layer structure of a first resin layer, a plastic layer and a second resin layer was prepared.

By performing thermocompression bonding by a roll-to-roll process using a thermocompression bonding laminator ("MRK-650Y Type" available from MCK CO., LTD.), a kind of the first resin layer, a kind of the plastic layer and a kind of the second resin layer shown in the following Tables 1 and 2 were layered to obtain an interlayer film.

(2) Preparation of Laminated Glass

The interlayer film obtained was cut into a size of 30 cm in longitudinal length×30 cm in transversal length. Moreover, two sheets of clear glass (30 cm in longitudinal length×30 cm in transversal length×2.5 mm in thickness) were prepared. Between the two sheets of clear glass, the interlayer film obtained was sandwiched, held in place for 30 minutes at 90° C. and pressed under vacuum with a vacuum laminator to obtain a laminate. With regard to the laminate, interlayer film portions protruded from the glass plate were cut away to obtain a sheet of laminated glass.

(Evaluation)

(1) Wetting Tension

A plastic layer was evaluated for the wetting tension of each of the first surface and the second surface. Using a liquid mixture for wetting tension test (available from Wako Pure Chemical Industries, Ltd.) and using an ASPURE cotton swab for industrial use (available from AS ONE Corporation), the liquid mixture was applied at 23° C. to measure the wetting tension at 23° C. in accordance with JIS K6768. The evaluation was visually performed, the measurement was performed five times per one sample, and an average of 5 measured values was defined as the wetting tension.

(2) Inter-Layer Peeling Resistance

The sheet of laminated glass obtained was visually observed to evaluate whether or not inter-layer peeling has occurred. In this connection, a sheet of laminated glass in which inter-layer peeling has occurred is poor in appearance because the inter-layer peeling (delamination) has occurred. The inter-layer peeling resistance was judged according to the following criteria.

[Inter-Layer Peeling Resistance]

○: No inter-layer peeling is observed.

x: Inter-layer peeling is observed.

(3) Penetration Resistance

Laminated glass was evaluated for the penetration resistance in accordance with JIS S3205. The penetration resistance was judged according to the following criteria. Specifically, a steel sphere with a mass of 2,260 g was selected from among steel spheres in accordance with JIS B1501, the steel sphere was positioned at an arbitrary height from the laminated glass surface placed on a horizontal plane, and the steel sphere in a still state was dropped toward the central part of a sheet of laminated glass without applying any force. An arbitrary height, namely, a distance from the laminated glass surface to a steel sphere, was set to X m, and the steel sphere was dropped toward the central part of each of two sheets of laminated glass. When the steel sphere penetrates through one sheet of laminated glass and does not penetrate through the other sheet of laminated glass among the two sheets of laminated glass, the MBH is defined as X m. When the steel sphere penetrates through any of the two sheets of laminated glass, an arbitrary height, namely, a distance from the laminated glass surface to a steel sphere, was set to (X−0.5) m, and two sheets of laminated glass were evaluated for the MBH. When the steel sphere does not penetrate through any of the two sheets of laminated glass, an arbitrary height, namely, a distance from the laminated glass surface to a steel sphere, was set to (X+0.5) m, and two sheets of laminated glass were evaluated for the MBH. This evaluation was repeated while changing the arbitrary height X m to be in 0.5 m increments, and the respective sheets of laminated glass in examples and comparative examples were evaluated for the MBH.

[Criteria for Judgment in Penetration Resistance]

○○: The MBH is greater than or equal to 5 m.

○: The MBH is greater than or equal to 4 m and less than 5 m.

x: The MBH is less than 4 m.

The details and the results are shown in the following Tables 1 and 2.

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| First resin layer | Kind | A | A | A | A | A | A | A | A |
| Plastic layer | Kind | A | B | C | D | AA | BB | CC | AC |
|  | Wetting tension (mN/m) | 55 | 45 | 43 | 55 | 58 | 46 | 48 | 55/43 |
| Second resin layer | Kind | A | A | A | A | A | A | A | A |
|  | Inter-layer peeling resistance | ○ | ○ | ○ | ○ | ○ | ○ | ○ | ○ |
|  | Penetration resistance | ○ | ○ | ○ | ○ | ○ | ○ | ○ | ○ |

TABLE 1-continued

|  | | Ex. 9 | Ex. 10 | Ex. 11 | Ex. 12 | Ex. 13 | Ex. 14 | Ex. 15 | Ex. 16 |
|---|---|---|---|---|---|---|---|---|---|
| First resin layer | Kind | B | B | B | B | B | B | B | B |
| Plastic layer | Kind | A | B | C | D | AA | BB | CC | AC |
|  | Wetting tension (mN/m) | 55 | 45 | 43 | 55 | 58 | 46 | 48 | 55/43 |
| Second resin layer | Kind | B | B | B | B | B | B | B | B |
|  | Inter-layer peeling resistance | ◯ | ◯ | ◯ | ◯ | ◯ | ◯ | ◯ | ◯ |
|  | Penetration resistance | ◯◯ | ◯◯ | ◯◯ | ◯◯ | ◯◯ | ◯◯ | ◯◯ | ◯◯ |

TABLE 2

|  | | Comp. Ex. 1 | Comp. Ex. 2 | Comp. Ex. 3 | Comp. Ex. 4 | Comp. Ex. 5 |
|---|---|---|---|---|---|---|
| First resin layer | Kind | A | A | A | A | A |
| Plastic layer | Kind | std | a | b | c | aa |
|  | Wetting tension (mN/m) | 30 | 18 | 30 | 35 | 30 |
| Second resin layer | Kind | A | A | A | A | A |
|  | Inter-layer peeling resistance | X | X | X | X | X |
|  | Penetration resistance | X | X | X | X | X |

|  | | Comp. Ex. 6 | Comp. Ex. 7 | Comp. Ex. 8 | Comp. Ex. 9 | Comp. Ex. 10 |
|---|---|---|---|---|---|---|
| First resin layer | Kind | B | B | B | B | B |
| Plastic layer | Kind | std | a | b | c | aa |
|  | Wetting tension (mN/m) | 30 | 18 | 30 | 35 | 30 |
| Second resin layer | Kind | B | B | B | B | B |
|  | Inter-layer peeling resistance | X | X | X | X | X |
|  | Penetration resistance | X | X | X | X | X |

In this connection, specific examples of the interlayer film having a three-layer structure of a first resin layer, a plastic layer and a second resin layer were shown. It was also confirmed that an interlayer film having a two-layer structure of a first resin layer and a plastic layer was excellent in inter-layer peeling resistance and penetration resistance when the resin layer and the plastic layer which are the same as those for Examples were used, as compared to the case where the resin layer and the plastic layer which are the same as those for Comparative Examples were used.

EXPLANATION OF SYMBOLS

1: Interlayer film
1a: First surface
1b: Second surface
2: Plastic layer
2a: First surface
2b: Second surface
3: First resin layer
3a: Outer surface
4: Second resin layer
4a: Outer surface
11: Laminated glass
21: First laminated glass member
22: Second laminated glass member

The invention claimed is:

1. An interlayer film for laminated glass, comprising a plastic layer constituted of a plastic sheet and a first resin layer layered on a first surface of the plastic layer,
the interlayer film being provided or not being provided with a second resin layer layered on a second surface opposite to the first surface of the plastic layer,
the first surface of the plastic layer constituted of the plastic sheet and the second surface opposite to the first surface being coated with a surface treatment agent so that the wetting tension of each of the first surface and the second surface is greater than or equal to 40 mN/m, and
the first resin layer containing a polyvinyl acetal resin and a plasticizer and when the interlayer film is provided with the second resin layer, the second resin layer containing a polyvinyl acetal resin and a plasticizer.

2. The interlayer film for laminated glass according to claim 1, wherein the content of the hydroxyl group of the polyvinyl acetal resin contained in the first resin layer is greater than or equal to 29% by mole, and when the interlayer film is provided with the second resin layer, the content of the hydroxyl group of the polyvinyl acetal resin contained in the second resin layer is greater than or equal to 29% by mole.

3. The interlayer film for laminated glass according to claim 1, being provided with the second resin layer.

4. The interlayer film for laminated glass according to claim 1, wherein the first resin layer further contains an ultraviolet ray screening agent.

5. The interlayer film for laminated glass according to claim 1, being provided with the second resin layer,
wherein the second resin layer further contains an ultraviolet ray screening agent.

6. The interlayer film for laminated glass according to claim 1, wherein the first resin layer further contains an oxidation inhibitor.

7. The interlayer film for laminated glass according to claim 1, being provided with the second resin layer,
wherein the second resin layer further contains an oxidation inhibitor.

8. A laminated glass, comprising a first laminated glass member, a second laminated glass member and an interlayer film for laminated glass according to claim 1,
the interlayer film for laminated glass being arranged between the first laminated glass member and the second laminated glass member.

9. The interlayer film for laminated glass according to claim 1,
wherein the first resin layer further contains an ultraviolet ray screening agent, and the content of the ultraviolet ray screening agent in the first resin layer is greater than or equal to 0.1% by weight and less than or equal to 2.5% by weight in 100% by weight of the first resin layer,
the plastic layer contains a thermoplastic resin other than the polyvinyl acetal resin, and
the plastic layer does not contain a polyvinyl acetal resin; or the plastic layer contains a polyvinyl acetal resin and the content of the polyvinyl acetal resin in the plastic layer is less than or equal to 20% by weight in 100% by weight of the plastic layer.

10. A method for manufacturing an interlayer film for laminated glass, comprising the steps of:
providing a plastic sheet to be treated having a wetting tension of each of a first surface and a second surface opposite to the first surface of less than 40 mN/m and coating a surface treatment agent on the first surface and the second surface to obtain a plastic layer constituted of the plastic sheet, wherein a wetting tension of each of the first surface and the second surface of the plastic layer constituted of the plastic sheet is greater than or equal to 40 mN/m; and
obtaining an interlayer film for laminated glass which comprises the plastic layer constituted of the plastic sheet and a first resin layer layered on the first surface of the plastic layer, the interlayer film being provided or not being provided with a second resin layer layered on the second surface opposite to the first surface of the plastic layer, the first resin layer containing a polyvinyl acetal resin and a plasticizer, and when the interlayer film is provided with the second resin layer, the second resin layer containing a polyvinyl acetal resin and a plasticizer.

* * * * *